July 1, 1930.  J. R. LUCAS  1,768,991
TENSION INDICATING DEVICE
Filed April 22, 1929
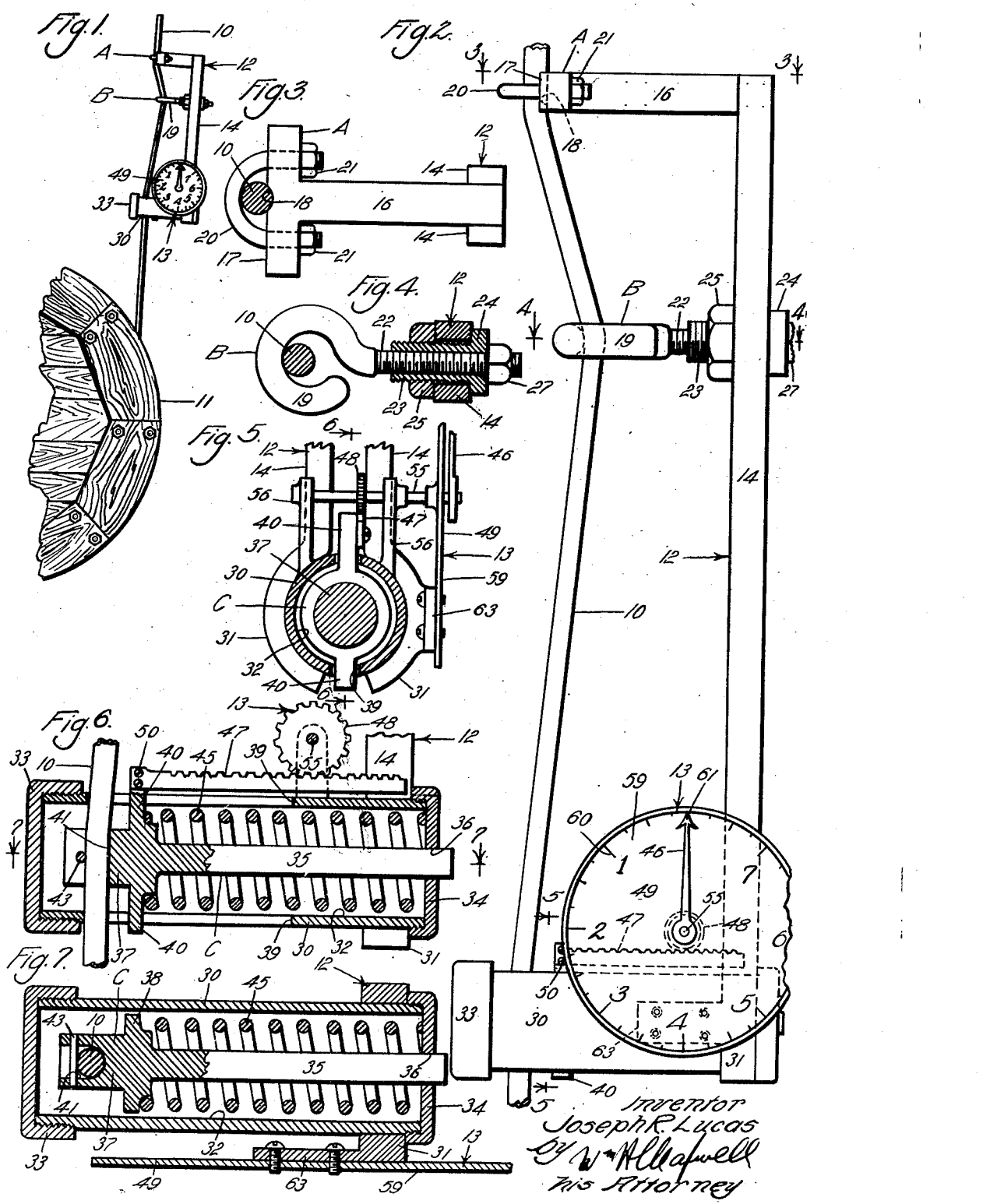

Patented July 1, 1930

1,768,991

UNITED STATES PATENT OFFICE

JOSEPH R. LUCAS, OF BAKERSFIELD, CALIFORNIA

TENSION-INDICATING DEVICE

Application filed April 22, 1929. Serial No. 357,073.

This invention relates to a tension indicating device and has particular reference to a device for indicating the tension on a cable, wire, rope, or the like.

In well drilling operations, drill pipe, casing, and various parts and tools are usually handled by a cable operating through a crown block, located at the top of the derrick, and a travelling block, to which the drill pipe, casing, tools, etc., are connected. One end of the cable extends downwardly from the crown block and is wound onto a drum of the draw works. The other end is usually held stationary and is known as the dead end. It is often very desirable to known the weight supported by the cable; for example, when drilling with the rotary method, it is desirable to know what portion of the total weight of the drill pipe is carried by the cable as this information as to the weight on the drilling bit or tool at the lower end of the drill is a material aid in drilling. Various types of devices are used to connect to the portion of the cable, which is held stationary and which is commonly called the dead line, to indicate the amount of weight supported by the cable. These devices are usually of complicated construction and are more or less expensive of manufacture.

It is an object of this invention to provide a device for indicating the tension on a cable, rope, or the like, that is of simple and improved construction and which is inexpensive of manufacture.

It is another object of the invention to provide a device of the character mentioned that is particularly adapted to accurately indicate the load carried by a dead line of a well drilling rig.

Another object of the invention is to provide an indicating device of the character mentioned that is adjustable to operate under various conditions.

It is a further object of the invention to provide a tension indicating device of the character mentioned that is adjustable to accurately measure slight differences in tension on the cable.

The various objects and features of my invention will be best and more fully understood from the following detailed description of a typical form and application of the invention, throughout which description reference will be had to the accompanying drawings, in which:

Fig. 1 is a view showing the device provided by this invention in operating position on a cable or dead line of a drilling rig. Fig. 2 is an enlarged side elevation of the indicator showing it in operating position on a cable. Fig. 3 is a top or plan view taken as indicated by line 3—3 on Fig. 2. Fig. 4 is a transverse detailed sectional view taken as indicated by line 4—4 on Fig. 2. Fig. 5 is an enlarged vertical detailed sectional view taken substantially as indicated by line 5—5 on Fig. 2. Fig. 6 is an enlarged vertical detailed sectional view taken substantially as indicated by line 6—6 on Fig. 5. Fig. 7 is an enlarged transverse detailed sectional view taken as indicated by line 7—7 on Fig. 6.

The tension indicating device provided by this invention is applicable to various types of work and for use in connection with various forms of weight or load carrying members. For instance, it is adapted to be used to indicate tension on cables, wires, ropes, etc. In the form of the invention described in the following detailed description I have set forth the device as applied to a cable 10 which may be considered the dead line of a well drilling rig, and have shown the cable extending upwardly from a wheel 11. It is to be understood, however, that the invention is not to be construed as limited to the specific form and application set forth, but is to be taken in its broader aspects as including those structures which may fall within the scope of the claims.

The tension indicating device provided by this invention includes, generally, an elongate frame 12, two relative stationary members A and B carried by the frame 12 and engaging the cable 10 at spaced points, a movable member C carried by the frame and engaging the cable 10 at a point removed from the members A and B, and means 13 for indicating movement of the member C. The device of this invention operates to crimp or bend the cable between the spaced members A, B and C and indicates the force with which the cable tends to straighten upon a tension being exerted on it.

The frame 12 is an elongate member and is arranged at one side of the cable 10 in a substantially vertical position parallel to the cable. The frame may be of any suitable form and construction. In the form of the invention illustrated I have shown the frame as including two parallel straps 14 spaced a short distance apart. The straps 14 may be rectangular in cross section, as shown in the drawings.

The member A is carried by an arm 16 projecting laterally outward from the upper end of the frame 12. The arm may be secured, say welded, between the straps 14. With this arrangement the arm 16 acts to space the straps. A cross head 17 is provided at the outer end of the arm. The cross head 17 extends from opposite sides of the arm 16 and may be formed integral with the arm. The outer side of the cross head is provided with a vertical groove 18 to receive the cable 10. The groove 18 is preferably rounded and is centrally located between the ends of the cross head 17 in alignment with the arm 16. A retaining bracket or U-bolt 20 is carried by the cross head 17 and extends around the cable to retain the cable in engagement with the cross head. The bolt extends through the projecting portions of the head and is made tight by nuts 21.

The other stationary member B is carried by the frame below the member A and is adjustably carried so as to be adjustable vertically relative to the member A and laterally relative to the frame. The member B consists of a part having a hook or eye 19 at its outer end engaging around the cable, and a screw-threaded stem 22 extending between the straps 14. The member B is somewhat shorter than the member A and projects laterally from the frame directly below and parallel to the member A. The stem 22 threads into a sleeve or carriage 23 arranged between the straps 14. The carriage 23 is provided with an annular flange 24 which engages what I will term the rear sides of the straps 14. A locking nut 25 is screw threaded on the carriage 23 and clamps against the front sides of the straps. The stem 22 extends completely through the carriage, and may be provided beyond the flange 24 with a locking nut 27 to clamp against the flange 24. The member B being attached to the frame in this manner, is adjustable both vertically and horizontally and is adapted to be shifted to engage the cable 10 at various points relative to the point of engagement of the cable and the member A. The hook or eye 21 retains the cable in engagement with the member B so that the member B acts to hold the cable 10 in pressure engagement with the members A and C.

The member C is carried by the frame 12 to engage the cable 10 at a point spaced below the members A and B. The member C extends laterally from the frame and is arranged directly below the members A and B to normally engage the cable at a point substantially in vertical alignment with the cable engaging groove 18 of the member A. The member C is shiftably or slidably carried by the frame to be operable laterally upon the cable being put under tension. In the form of the invention illustrated the member C is slidably carried in a tubular housing 30 mounted at the lower end part of the frame 12. The lower end portions of the straps 14 are curved or bowed outwardly and the housing 30 extends between the bowed portions 31. The bowed portions 31 of the straps 14 may be attached, for instance, welded to the housing 30. The opening 32 in the housing 30 may be closed at its outer or front end by a cap 33, while its inner or rear end may be closed by a cap 34.

The member C is slidably carried in the housing 30 and extends longitudinally through the opening 32. The member C consists of a stem part 35, guided in a central opening 36 in the inner or rear cap 34, and a head 37 on the outer end of the stem. The stem part 35 may be round in cross section and extends a substantial distance through the housing 30. The head 37 is in the form of an enlargement on the outer end portion of the stem and may be round in cross section. An annular flange 38 is provided on the head to slidably fit within the housing 30. The stem part 35 is slidable in the opening 36 of the cap 34 and acts to guide the member C in the housing 30. The housing 30 is provided with two diametrically opposite longitudinal slots 39. The slots 39 are in the upper and lower parts of the housing 30 and are made to freely pass the cable 10. Two diametrically opposite radial guides 40 project from the annular flange 38 of the head and are slidable in the slots 39. The guides 40 prevent the member C from turning or rotating in the housing 30. The outer end of the head 37 is provided with a vertically extending U-shaped groove 41 to carry the cable 10. The groove 41 is comparatively deep and the cable 10 extends completely into the groove. A retaining pin 43 extends transversely through the groove 41 and prevents the cable from becoming displaced from the groove. The member C is urged outwardly into pressure engagement with the cable 10 by a helical spring 45 arranged under compression in the opening 32 between the flange 38 and the cap 34 at the inner or rear end of the housing. The spring 45 is comparatively strong so that the cable is held in the outer end portions of the slots 39 during normal working conditions. The member C moves in and out in the housing 30 as varying tension strains are exerted on the cable and the cable tends to straighten.

The means 13 provided to indicate the movement of the member C and thus indicate the amount of tension on the cable 10, includes a graduated dial 49, an indicating hand 46, a rack 47 attached to the member C, and a pinion gear 48 connected to the hand 46 and meshing with the rack 47. In the case illustrated the rack 47 is connected to the guide 40 projecting through the top or upper portion of the housing 30. The rack 47 may be attached to the guide 40 by means of screw 50, as illustrated, and extends laterally toward the frame 12 over the housing 30. The rack may be guided between the straps 14 as shown in the drawings. The indicating hand 46 and the pinion gear 48 are fixed on a shaft 55 extending transversely over the housing 30. The shaft is supported by two bearing members 56 projecting upwardly from the housing. The shaft 55 extends between the bearing member 56 and extends outwardly from one of the members to a point beyond the side of the housing. The pinion gear 48 is fixed on the shaft 55 between the bearing members 56 directly above and in meshing engagement with the rack 47. The outwardly extending portion of the shaft 56 extends through the center of the dial 49 which is in the form of a circular disc vertically disposed at one side of the housing. The dial 49 may be attached to one of the straps 14 by means of a bracket 63. The indicating hand 46 is fixed on the end portion of the shaft which extends through the dial 49 and is arranged to operate at or over the outer face of the dial 49. The outer face 59 of the dial is provided at its peripheral portion with graduations or markings 60 and the indicating hand 46 is provided at its end with an arrow or finger 61 to move between the graduations or markings 60 of the dial. Movement of the member C causes the rack to actuate the shaft through the pinion gear 48 and the hand 46 is moved across the outer face 59 of the dial.

In operation the device is mounted on the cable 10 as shown in the drawings and the member B is adjusted either vertically or horizontally or both so that the cable is crimped to exert the desired pressure on the member C. The adjustment may be made to suit various operating conditions. As tension is exerted on the cable 10, the cable tends to straighten between the member B and its point of connection with the wheel 11. As the cable straightens, the member C is moved inwardly and the indicating hand 46 is moved around on the outer face 59 of the dial, thus indicating the tension on the cable. The relationship between the amount of tension on the cable and amount of movement of the head 46 is governed by the position of the point of engagement of the member B with the cable with reference to the location of the point of engagement of the cable and the members A and C. The member B may be adjusted to give the desired movement to the hand 46 for a given amount of tension on the cable. In this manner the device may be used under various conditions and may be used to indicate wide ranges of variation in tension on a cable, or limited ranges. The tension indicator provided by this invention is easily and quickly attached to a cable, or the like, and is extremely simple of operation. The parts are inexpensive of manufacture and the device does not include any small delicate parts. The device provided by this invention is unitary and is supported entirely by the cable to which it is attached.

Having described only a typical, preferred form of my invention, I do not wish to limit myself to the specific details set forth, but wish to reserve to myself any changes or variations that may appear to those skilled in the art or fall within the scope of the following claims.

Having described my invention, I claim:

1. A tension indicating device of the character described including, an elongate frame, a stationary member carried by the frame to engage the cable, a movable member carried by the frame for movement laterally of the frame, to engage the cable at a point spaced from the point of engagement of the cable and said stationary member, a third member between the stationary member and the movable member for holding the cable in pressure engagement with the movable member, and means for adjusting the third member laterally of the frame, the third member being longitudinally adjustable on the frame.

2. A tension indicating device of the character described for use in connection with a cable including, a frame, a stationary member on the frame to engage the cable, a movable member slidably carried by the frame to engage the cable at a point spaced from the point of engagement of the cable and the first mentioned member, and a third member between the stationary member and the movable member for holding the cable in pressure engagement with the movable member.

3. A tension indicating device of the character described for use in connection with a cable including, a frame, a stationary member carried by the frame to engage the cable, a movable member carried by the frame to engage the cable at a point spaced from the point of engagement of the stationary member and the cable, a stationary member on the frame to engage the cable between the other two members and act under tension to hold the cable in pressure engagement with the movable member, and means indicating the extent of movement of the movable member.

4. A tension indicating device of the character described for use in connection with a cable including, an elongated frame, a stationary member carried by the frame to engage the cable, a movable member carried by the frame to engage the cable at a point spaced from the point of engagement of the stationary member and the cable, a second stationary member mounted on the frame engaging the cable between the other two members and holding the cable in pressure engagement with the movable member, the second stationary member being longitudinally adjustable on the frame, and means indicating the extent of movement of the movable member.

5. A tension indicating device of the character described for use in connection with a cable including, a frame, a stationary member carried by the frame to engage the cable, a movable member slidably carried by the frame for lateral movement and adapted to engage the cable at a point spaced from the point of engagement of the stationary member and the cable, means yieldingly urging the movable member against the cable, a second stationary member on the frame engaging the cable between the other two members and hold the cable in pressure engagement with the movable member, and means indicating the extent of movement of the movable member.

6. A tension indicating device of the character described for use in connection with a cable including, an elongate frame, a stationary member carried in fixed position at one end of the frame to engage the cable, a movable member slidably carried at the other end of the frame to engage the cable at a point spaced from the point of engagement of the stationary member and the cable, a second stationary member on the frame intermediate its ends to engage the cable between the other two members and hold the cable in pressure engagement with the movable member, and means operatively connected with the movable member to indicate the extent of movement of the movable member.

7. A device of the character described to indicate the tension on a cable, including, an elongate frame, two members carried by the frame to engage the cable at spaced points, one of the members being slidably carried by the frame for movement laterally of the frame, a third member on the body engaging the cable between the two first mentioned members to hold the cable in pressure engagement with the other two members, spring means normally urging the movable member against the cable, and means indicating the extent of lateral movement of the movable member.

8. A device of the character described to indicate tension on a cable including, an elongated frame, two members carried by the frame to engage the cable at spaced points, one of the members being carried by the frame for lateral movement, a third member on the body engaging the cable between the two first-mentioned members holding the cable in pressure engagement with the two members, the third member being longitudinally adjustable on the frame, spring means normally urging the movable member against the cable, an indicating device, and a gear mechanism operatively connecting the movable member and indicating device.

9. A device of the character described to be applied to a cable to indicate tension on the cable including, an elongate frame, a stationary member extending laterally from the frame and engaging the cable, a movable member spaced from the first mentioned member and slidable laterally relative to the frame, a second stationary member engaging the cable between the other two members and holding the cable in pressure engagement with the movable member, the said second stationary member being longitudinally adjustable on the frame, yielding means urging the movable member against the cable, and means for indicating the extent of movement of the movable member.

10. A tension indicating device of the character described for use in connection with a cable including, a frame, a stationary member carried by the frame to engage the cable, a movable member slidably carried by the frame and engaging the cable at a point spaced from the point of engagement of the stationary member and the cable, a second stationary member on the frame engaging the cable between the other two members and holding the cable in pressure engagement with the movable member, and means indicating the extent of movement of the movable member, said means including, a rack on the movable member, a shaft, a pinion on the shaft meshing with the rack, and an indicating hand on the shaft.

11. A device of the character described to be applied to a cable to indicate tension on the cable including, an elongate frame, a stationary member projecting laterally from the frame and engaging the cable, a movable member spaced from the first mentioned member and slidable laterally relative to the frame, an adjustable member engaging the cable between the other two members and holding the cable in pressure engagement with the movable member, the adjustable member being longitudinally adjustable along the frame and laterally of the frame, yielding means urging the movable member against the cable, and means for indicating the extent of movement of the movable member, said adjusting means including, a stem carrying the member, and a carriage slidable in the body, the stem being screw threaded to the carriage.

12. A device of the character described to be applied to a cable to indicate tension on the cable including, a frame, a stationary member projecting laterally from the frame and engaging the cable, a movable member spaced from the first mentioned member and slidable laterally relative to the frame, an adjustable member engaging the cable between the other two members and holding the cable in pressure engagement with the movable member, means for adjusting the adjustable member, yielding means urging the movable member against the cable, and means for indicating the extent of movement of the movable member, said adjustable means including, a threaded stem on the member, a carriage for the stem, slidable along the frame, and means for setting the carriage against movement along the frame.

13. A tension indicating device of the character described for use in connection with a cable including, a frame, a stationary member on the frame in engagement with the cable, a movable member slidably carried by the frame and engaging the cable at a point spaced from the point of engagement of the cable and the first mentioned member, and a third member between the stationary member and the movable member, holding the cable in pressure engagement with the movable member, said movable member being slidably carried in a housing on the body.

14. A tension indicating device of the character described for use in connection with a cable including, a frame, a stationary member on the frame in engagement with the cable, a movable member slidably carried by the frame and engaging the cable at a point spaced from the point of engagement of the cable and the first mentioned member and a third member between the stationary member and the movable member holding the cable in pressure engagement with the movable member, said movable member being slidable in a housing on the body, there being a spring in the housing urging the movable member against the cable.

15. A tension indicating device of the character described for use in connection with a cable including, a frame, a stationary member carried by the frame, and in engagement with the cable, a movable member slidably supported on the frame and engaging the cable at a point spaced from the point of engagement of the stationary member and the cable, a stationary member on the frame engaging the cable between the other two members and holding the cable in pressure engagement with the movable member, and means indicating movement of the movable member, said means including, a graduated dial, a hand to operate on the dial, and an operating connection between the hand and the movable member.

16. A device of the character described to be applied to a cable to indicate tension on the cable including, an elongate frame, a stationary member projecting laterally from the frame and engaging the cable, a movable member spaced from the first mentioned member and slidable laterally relative to the frame, an adjustable member engaging the cable between the other two members and holding the cable in pressure engagement with the movable member, means for adjusting the adjustable member along the frame and laterally of the frame, yielding means urging the movable member against the cable, and means for indicating the extent of movement of the movable member.

In witness that I claim the foregoing I have hereunto subscribed my name this 3rd day of April, 1929.

JOSEPH R. LUCAS.